Figure 1:
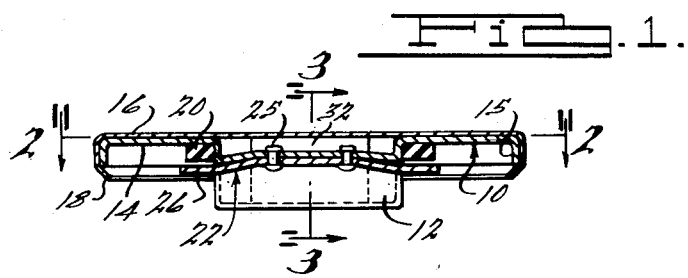

Aug. 13, 1957 R. T. CLIFTON 2,802,592
MAGNETIZED GAS CAP
Filed April 8, 1954

INVENTOR.
Richard T. Clifton
BY
Harness, Dickey & Pierce
ATTORNEYS

United States Patent Office 2,802,592
Patented Aug. 13, 1957

2,802,592
MAGNETIZED GAS CAP
Richard T. Clifton, Detroit, Mich.

Application April 8, 1954, Serial No. 421,929

4 Claims. (Cl. 220—40)

This invention relates to the construction of closures, particularly for gasoline tanks of motor vehicles and has for its principal object the provision of an improved cap provided with magnetic holding means so arranged that when the cap is removed from the filler neck and laid upon an adjacent or convenient portion of the vehicle, such as a bumper, fender, trunk portion or the like, the cap will be held in place by magnetic force, and if the filling station attendant should neglect to replace the cap upon the filler neck, the cap will remain attached to the vehicle by magnetic force and cannot be dislodged, even though the vehicle is thereafter driven over rough roads.

Another object of the invention is to provide an improved cap of inexpensive character equipped with supplemental magnetic holding means so arranged as to be highly effective in holding the cap in place and against dislodgement when the cap is laid upon magnetic metal, such as is ordinarily used in the construction of automobile bodies, bumpers and the like.

Still another object is to provide such a cap equipped with magnetic holding means which is effective to hold the cap upon the vehicle no matter how or in what position the cap is laid or placed upon the vehicle.

Other objects and advantages of the invention will become apparent upon consideration of the present disclosure in its entirety.

Figure 2:
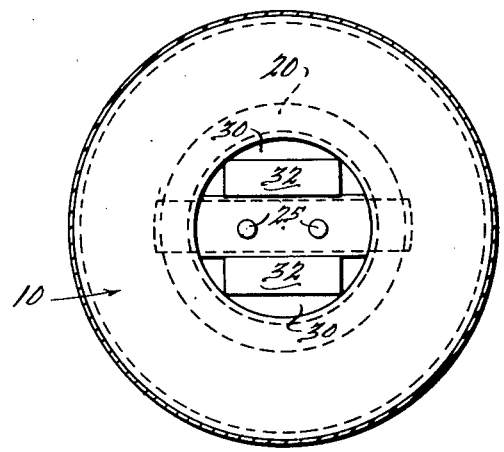
Figure 3:
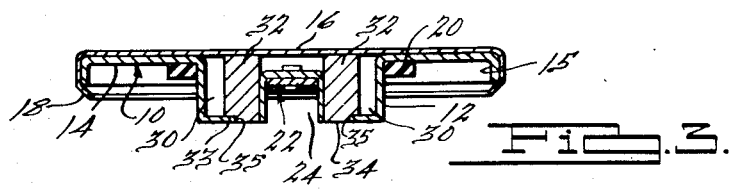
Figure 4:
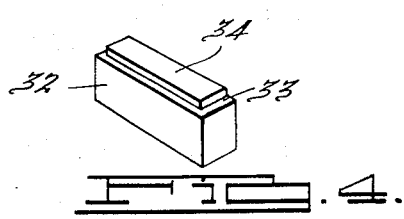

In the drawing:

Figure 1 is a diametric cross-sectional view of a cap constructed in accordance with the present invention;

Figs. 2 and 3 are sectional views taken substantially on the lines 2—2 and 3—3 of Fig. 1, and looking in the direction of the arrows; and Fig. 4 is a perspective view of one of the holding magnets, inverted to afford a better view of the rabbeted corner.

Referring now to the drawing, reference character 10 designates generally a sheet metal stamping forming the body of my improved cap and which is generally of circular form, having two laterally spaced partly cylindrical depressed central embossments forming a plug section 12 with a diametric reentrant central slotlike passage 24 therethrough, and a substantially flat radially extending top portion 14 projecting outwardly from the upper extremity of the plug portion 12 and terminating in a cylindrical flange 15. A finishing sheath portion 16 which may be formed of stainless steel or other material having a surface of attractive appearance embraces the body portion 10 and is bent inwardly beneath the flange 15 as indicated at 18 for retention.

A resilient gasket as 20 encircles the plug portion 12 and lies against the flat stop portion 14, being adapted to seal the top of the filler neck in the conventional manner, and the cap is also preferably provided with a suitable bayonet-type retaining finger assembly 22, which may be formed of spring material and which in the construction shown consists of a single transverse and relatively narrow leaf spring member extending transversely through the reentrant embossed depression 24 in the plug portion 12 of the body, to which it is suitably secured as by rivets 25. The retaining resiliently supported finger portions 26 project radially from the plug section, spacedly beneath the gasket 20, and are adapted to coact with suitably inclined bayonet-type retaining portions formed upon the filler neck (not shown) as will be appreciated by those skilled in the art.

It will be seen that on either side of the reentrant transverse slotlike portion 24 which houses the bayonet spring finger element 22 the distance between the interior of the sheath member 16 and the bottom of the hollow plug sections is increased, and as best shown in Fig. 1. A pair of chambers 30 are thereby provided in the body, one located on each side of the transverse reentrant housing portion 24 for the bayonet finger spring 22.

In each of the chambers 30 is a bar-type permanent magnet as 32, each extending into contact with and adapted to be retained by the sheath 16. If the sheath 16 is formed of substantially nonmagnetic material such as stainless steel, brass, aluminum or the like, it does not interfere substantially with the action of the magnets. If the sheath is made of steel, it may be desirable to provide apertures therein through which the magnets may at least partially extend, so that less of the magnetic flux will be diverted through the sheath, and a greater proportion thereof will be available to enter the body portion on which the cap may be laid. In the preferred illustrative cap depicted, it is presumed that the body portion 10 is formed of steel, and the manner in which such a steel enclosure portion may be relieved and apertured so that the magnets are exposed at the surface of the plug portion of the body, yet effectively retained, is illustrated in Fig. 1. As shown, each magnet is provided around three sides of its lower perimeter with a rabbet 33 so that the magnet includes a reduced downwardly extending portion 34 which is adapted to project through an aperture as 35 formed in the bottom of the pocket. The projecting portion of the magnet 34 may thus be substantially flush with or may project slightly from the bottom of the pocket section of the body plug and may thus directly engage and be fully effective to hold the cap upon a magnetic surface upon which the cap may be laid. It will be appreciated that if the body portion 10 be formed of nonmagnetic material such as brass, the apertures 35 may be omitted, and that if magnets of sufficient force are provided and the remainder of the cap construction is relatively light, the apertures need not be provided, even though the body be formed of steel. I preferably provide the apertured construction however, since it permits the use of lighter and consequently less expensive magnets without sacrifice of holding power.

While it will be apparent that the preferred embodiment of the invention herein described is well calculated to fulfill the objects and advantages first above stated, it will be appreciated that the invention is susceptible to variation, modification and change without departing from the fair meaning and proper scope of the appended claims.

I claim:

1. In a cover for tank openings and the like, a sheet metal body having a hollow embossed plug portion including a pocketlike portion opening toward one side of the cover, a sheath over the open side of said pocketlike portion, mechanical holding means carried by said cover for securing it in position with respect to a tank or the like, and a magnet located at least partly within said pocketlike portion and between said body and sheath, said magnet being strong enough to support the cover upon a magnetic metal surface independently of said mechanical holding means.

2. A construction as defined in claim 1 wherein said magnet extends from one side to the other of said cover, occupying substantially the full distance between said sheath and body in the region of said plug portion.

3. In a cover for tank openings and the like, a sheet metal body having a hollow embossed plug portion including a pocketlike portion opening toward one side of the cover, a sheath over the open side of said pocketlike portion, mechanical holding means carried by said cover for securing it in position with respect to a tank or the like, and a magnet located at least partly within said pocketlike portion and between said body and sheath, a part of the body in the region of said pocketlike portion occupied by said magnet being cut away to expose the magnet, said magnet being strong enough to support the cover upon a magnetic metal surface independently of said mechanical holding means.

4. A cover for tank openings and the like comprising, a sheet metal body having a plug portion provided with two laterally spaced embossed hollow depressions, a mechanical securing member secured to said plug portion in the area between said depressions for securing said cover in position with respect to a tank or the like, and supplemental permanent magnet retaining means located in said depressions on opposite sides of said member, said magnet being strong enough to support the cover upon a magnetic metal surface independently of said mechanical holding means.

References Cited in the file of this patent

UNITED STATES PATENTS

| | | |
|---|---|---|
| 2,225,205 | Brooks | Dec. 17, 1940 |
| 2,467,088 | Konchan | Apr. 12, 1949 |
| 2,659,169 | Brennan | Nov. 17, 1953 |
| 2,717,096 | Henderson | Sept. 6, 1955 |

FOREIGN PATENTS

| | | |
|---|---|---|
| 624,400 | Great Britain | June 7, 1949 |